Dec. 19, 1939.  A. C. MULLER  2,184,124
MECHANISM FOR TESTING IGNITION SYSTEMS
Filed Oct. 24, 1936  2 Sheets-Sheet 1
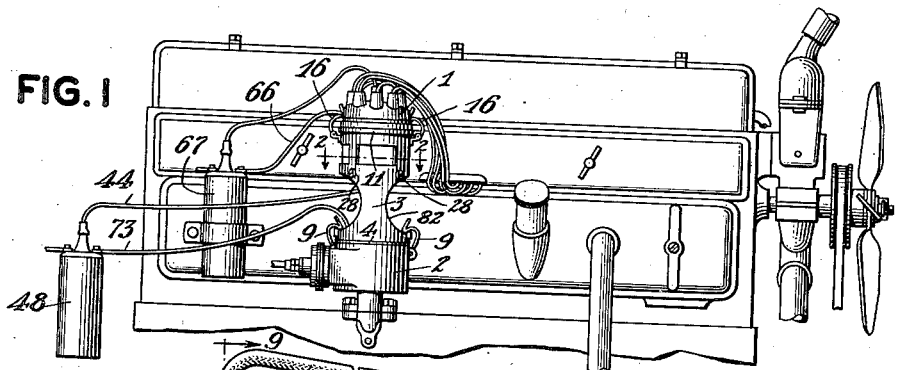
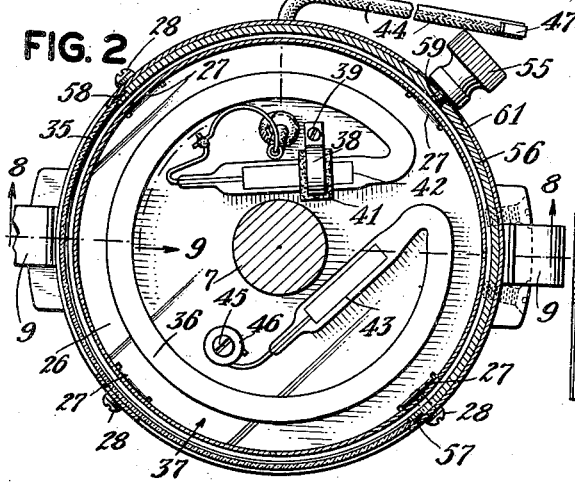
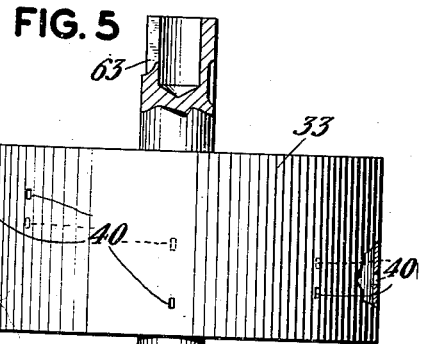
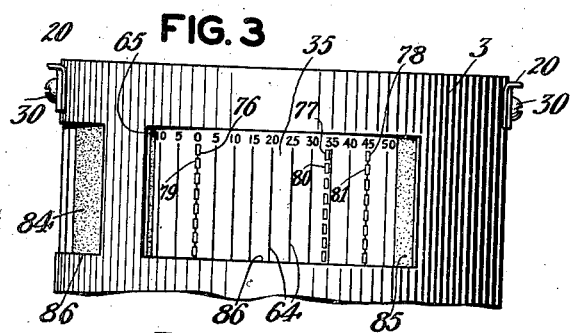
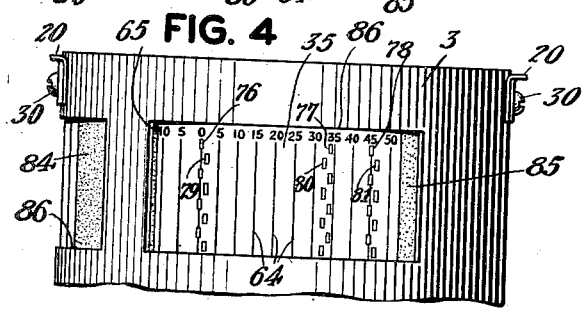
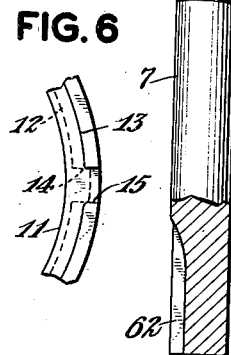
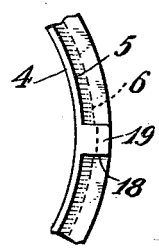
INVENTOR
ALEXANDER.C.MULLER
BY M.J.Reynolds
ATTORNEY Dec. 19, 1939.   A. C. MULLER   2,184,124
MECHANISM FOR TESTING IGNITION SYSTEMS
Filed Oct. 24, 1936   2 Sheets-Sheet 2
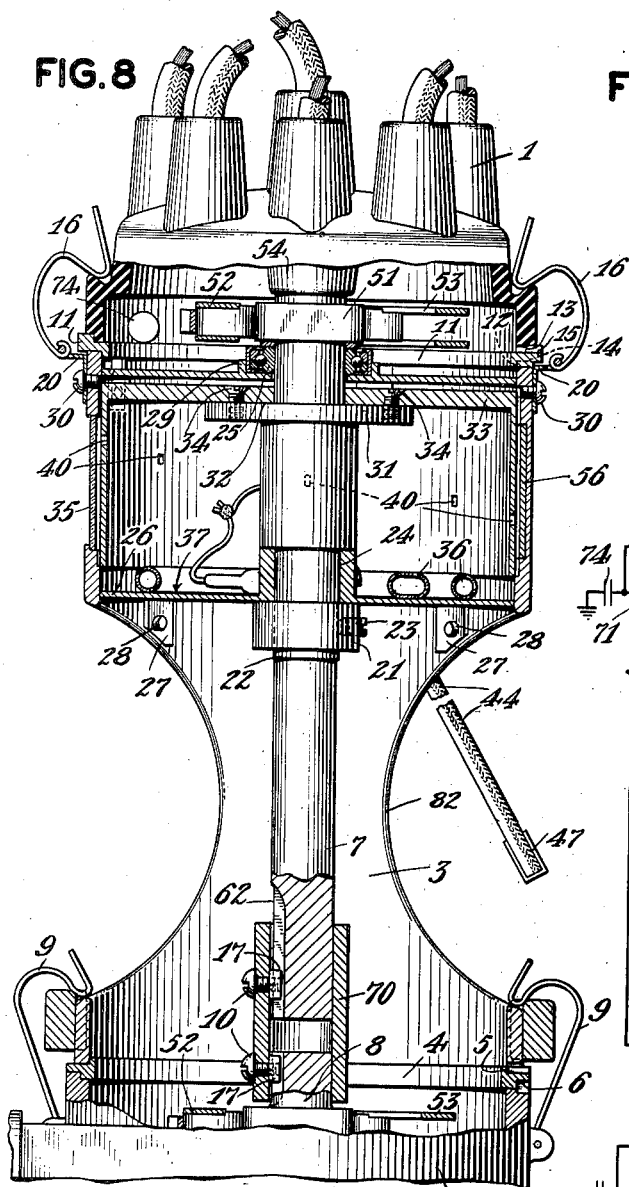
FIG. 8
FIG. 10
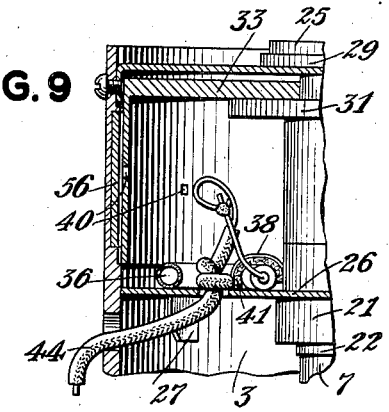
FIG. 9
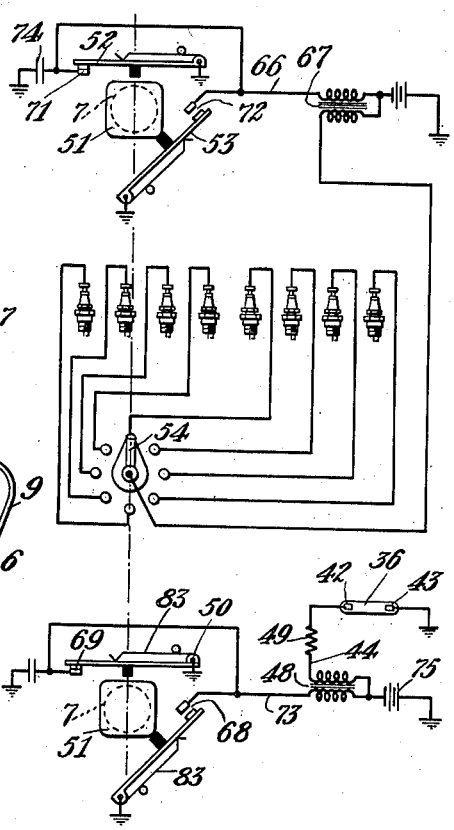
FIG. 11
INVENTOR
ALEXANDER C. MULLER
BY
M. J. Reynolds
ATTORNEY Patented Dec. 19, 1939

2,184,124

UNITED STATES PATENT OFFICE 2,184,124

MECHANISM FOR TESTING IGNITION SYSTEMS

Alexander C. Muller, Long Island City, N. Y., assignor of one-half to The Teleregister Corporation, New York, N. Y., a corporation of Delaware Application October 24, 1936, Serial No. 107,365

9 Claims. (Cl. 177—311)

This invention relates to mechanism for testing the ignition systems of internal combustion engines and the like, and more particularly for means for indicating the condition of the distributor used with such systems.

The ignition systems commonly used with multi-cylinder automobile and such like engines employ an interrupter controlling the ignition circuit which is provided with two sets of contacts arranged to close alternately in spaced relation to each other. When testing ignition systems of this character, the practice is to adjust each of these contacts independently of the other contact in accordance with a thickness gauge which is used to determine the separation between the contacts. Such a method of adjustment is not satisfactory for the reason that the contacts do not retain their smooth surfaces in operation but develop an irregular serrated surface with the formation of a "cone" and "crater" at the contacts as is well known in systems of this character. Therefore, the separation between contacts having irregular surfaces is greater than the distance between the contacts as measured by a thickness gauge.

For efficient operation it is required that the ignition for the cylinders controlled by one set of contacts shall occur at precisely the same instant with respect to the cycle of operation of the pistons within those cylinders as it occurs with respect to the cycle of operations of the pistons within the cylinders controlled by the other sets of contacts. The bearing of one of the breaker arms is usually made adjustable so that the breaker arm may be moved with respect to the other arm until a suitable adjustment has been obtained. This adjustment is not made, however, until after the contact separation has been correctly set.

One of the objects of this invention is to provide apparatus for giving a visual indication of the angle of contact of the breaker mechanism of the distributor while the distributor is operated by the engine.

Another object is to provide a testing device for comparing the phase relation between the operation of a first pair of contacts of a distributor with a second pair of contacts.

Another object is to provide an apparatus for testing the ignition system without removing the distributor from the engine.

A further object is to provide a testing device for visually indicating the angle of closure of the distributor contacts so that the readings for the angle of closure of one breaker arm may be compared and brought into alignment with the readings for the angle of closure of the other breaker arm.

An additional object is a novel arrangement for visually indicating a bouncing condition of the contacts due to vibrations of a breaker arm during the period of closure thereof.

Another object is to provide an apparatus which is so simple that it can be successfully used by an inexperienced operator to make settings of the angle of contact of a distributor which are accurate to a degree seldom attained by any other method of testing heretofore devised.

Other objects are to provide apparatus for testing a distributor which will detect defects such as a worn or eccentric ram, worm bearings, bent distributor shaft, worn breaker arm bearing or a weak breaker arm spring; to provide a testing device for directly comparing the closures of a plurality of breaker arms without disengaging the distributor from the engine, and for testing the distributor of an automobile engine under conditions approximating actual operating conditions such as, for example, different speeds of the engine while the distributor is integral with and driven by the engine.

A still further object is to provide means for checking the operation of the automatic spark advance feature of the ignition system at different engine speeds while the distributor is operated by the engine.

These and other objects as will hereinafter appear are accomplished by this invention, one form of which is disclosed and fully described in the following specification and shown in the accompanying drawings in which:

Fig. 1 is a view, in side elevation, of the testing mechanism in position on the engine of a well known make of automobile.

Fig. 2 is a sectional view taken on line 2—2 of Fig. 1.

Figs. 3 and 4 are fragmentary views in side elevation of the testing device shown in Fig. 1.

Fig. 5 is a view, in side elevation, partly in section of the rotatable element shown in Fig. 2.

Fig. 6 is a fragmentary view of the upper adapter ring shown in Figs. 1 and 8.

Fig. 7 is a fragmentary view of the lower adapter ring shown in Figs. 1 and 8.

Fig. 8 is a view, in side elevation, partly in section, taken on line 8—8 of Fig. 2.

Fig. 9 is a fragmentary view partly in section taken on line 9—9 of Fig. 2.

Fig. 10 is a view in side elevation of a testing table having the ignition tester secured thereto and shown in operative position with respect to an automobile whose distributor is to be tested.

Fig. 11 is a schematic diagram showing an embodiment of the invention.

Referring first to Fig. 1, distributor head 1 is shown removed from the distributor 2 and a housing 3 is positioned between the distributor and the distributor head. A lower adapter ring 4 having recessed portions 5 and 6, Figs. 7 and 8, is interposed between the housing and the distributor of the engine to cause the housing to assume a position in spaced relation to the engine distributor so that the shaft 7 is in alignment with the shaft 8 of the engine distributor. The housing is restrained from rotation with respect to the distributor by portions 18 and 19 of the lower adapter ring which are in engagement with complementary portions of the housing and distributor, respectively. The springs 9 press against the housing 3 to hold the same in rigid alignment with the distributor shaft 8. A coupling 70 engages the shafts 7 and 8 and is securely attached thereto by the screws 10 and keys 17.

Abutting the upper surface of the housing is the upper adapter ring 11 having recessed portions 12 and 13 and notched portions 14 and 15 for engagement with complementary portions on the upper portion of the housing 3 and the distributor head 1, respectively. The springs 16 are supported by the brackets 20 and attached to the housing 3 by screws 30 whereby the distributor head is held in alignment with the housing 3 and the shaft 7.

The adapter rings shown in Figs. 6 and 7 are provided to enable a single testing device to be employed with different distributors thereby obviating the necessity for duplicating the testing device when different distributors are to be tested. The upper and lower adapter rings are arranged for use in pairs and, when assembled upon the housing 3, the lower surface of the lower ring engages the upper surface of the distributor to be tested and the upper surface of the upper ring engages the lower surface of the distributor head.

When assembled in the manner described and as shown on Figs. 1 and 8, the distributor head 1 is in the same angular position with respect to the shaft 8 as though it were assembled directly on the distributor 2. The shaft 7 has a collar 21 rigidly mounted thereon abutting the shoulder 22 of the shaft 7 and retained in position by the screw 23. The shaft 7 is supported by the bearings 24 and 25, the bearing 24 being held in position by the shelf 26 and having projecting portions 27 securely clamped to the housing by the screws 28. The bearing 25 is retained by the shoulder 29 so that the shaft 7 is concentrically mounted with respect to the housing 3. Flange 31 is secured to and rotates integrally with the shaft 7 and at its upper surface 32 forms a support for the drum 33 which is securely attached thereto by the screws 34.

Referring to Fig. 5, drum 33 is provided with a plurality of apertures 40 spaced around its periphery. Each of these apertures rotates in a separate plane so that a series of images are formed upon the scale 35, Figs. 3 and 4, as the shaft 7 is rotated.

A glow discharge tube 36 is securely fastened to shelf 37 by the clamp 38 and screw 39. A resilient bushing 41 is interposed between the clamp and the glow discharge tube to maintain the tube in position without possibility of damage to the tube. The glow discharge tube is provided with electrodes 42 and 43, electrode 42 being in circuit with conductor 44 and electrode 43 being connected to the grounded shelf 26 by screw 45 and washer 46. The outer end of conductor 44 terminates in a tip 47 for connection with the high tension terminal of the induction coil 48, Fig. 1, either directly or through a resistance 49 as shown on Fig. 11.

Mounted on the shaft 7, and preferably although not necessarily, above the cylinder 33 is a cam 51 for causing the operation of breaker arms 52 and 53, Figs. 8 and 11 to close contacts 71 and 72 respectively. The shaft 7 is in registry with and supports the distributor arm 54 and is provided with keyways 62 and 63, Figs. 5 and 8, for aligning the cam 51 and the breaker arm assembly with the shaft 8.

An arcuate scale 35 which may be of translucent material and having shaded portions 84 and 85, is concentrically mounted within the upper part of the housing 3 and adjusted by means of the knurled screw 55 which is threaded on a stud 59 integral with the circular band 56 having registered portions 57 and 58 for supporting and retaining the scale 35. The stud 59 is movable within the slot 61 so that, by means of screw 55, the scale 35 may be adjusted and locked in the adjusted position by the adjusting screw 55. The scale 35 is provided with a series of graduations 64 representative of, for example, the angular degree of rotation of the distributor shaft. Associated with these graduations are indicia 65 for measuring the opening and closing of the contacts of the breaker arms.

When the appliance is to be used, the housing 3 is assembled on the engine distributor and the distributor head assembled on the housing in the manner shown on Figs. 1 and 8. The low tension conductor 66 associated with induction coil 67 is disconnected from the engine distributor and placed in circuit with the contacts 71 and 72 operated by the cam 51. The condenser 74 is employed to prevent sparking at these contacts. This arrangement enables the engine to operate under its own power using contacts 71 and 72 during which time the contacts 68 and 69 of the engine distributor are thus made available for test. The distributor contacts 68 and 69 are connected by way of conductor 73 to one end of the primary winding of the induction coil 48 and the other end of this winding is connected to a grounded potential 75 which may be obtained from any suitable source such as a battery or small generator. Conductor 44 is placed in circuit with the high tension terminal of the induction coil 48 and thus a circuit is completed from the induction coil 48 to the electrode 42 of the glow discharge tube. A resistance 49 may be included in series with the glow discharge tube, if desired, to suppress such undesirable high frequency oscillation as may occur if the voltage 75 is improperly adjusted.

As the engine is set in operation the contacts 68 and 69 close alternately so that the induction coil 48 receives a pulse at each such closure of the contacts and another pulse when these contacts open and thus generates a high potential pulse in the glow discharge tube circuit as each pulse is received. The voltage 75 is sufficiently high to cause a flash of the glow discharge tube when ground is applied to the primary winding of the induction coil 48. As is well known in induction coils of this type the voltage generated in the secondary winding of the coil is usually greater when the primary circuit is interrupted than when the primary circuit to the coil is closed. The resistance 49 inserted in circuit with the secondary winding of the induction coil 48 may be employed to suppress high frequency oscillations and prevent a secondary flash of the glow discharge tube when the primary circuit to the coil 48 is opened so that a single flash of the tube is obtained when the contacts 68 or 69 open or close. However, the voltage 75 is preferably of such value that the resistance 49 would not be required.

The drum 33 shown on Fig. 5, comprises 8 apertures 40 and is therefore suitable for use with the distributor of an 8 cylinder engine.

Assume in the case of an eight cylinder engine, for example, that the drum 33 is rotated in a counterclockwise direction by the engine and that the image formed by the uppermost aperture when the contacts 68 close appears on the scale at 76 and that the image formed by the opening of these contacts appears at 77. The next closure of contacts 68 appears at 78, Fig. 3. The corresponding images for the contacts 69 are shown at 79, 80 and 81. The first, third, fifth and seventh series of images in vertical order correspond to the contacts 68 and the remaining images in positions 2, 4, 6 and 8 correspond to the contacts 69. Fig. 3 shows the adjustment of both breaker arms to be identical and the contacts of each therefore close for the same duration of time. The angular degree of closure is measured by reference to the scale divisions after the scale has been adjusted to bring the 0 scale division into coincidence with the images corresponding to the point of closure of the distributor contacts. The period of closure of the contacts shown on Fig. 3 is 34 degrees and the open period is 11 degrees.

If the distributor arm controlling contacts 69 should be in such adjustment that the contacts 69 close 5 degrees too late with respect to the time of closure of contacts 68, the images 79, 80 and 81 and each other alternate set of images would appear 5 degrees to the right of the positions shown on Fig. 3. This condition would be corrected by moving the adjustable bearing 50 of the distributor arm controlling contacts 69 in a counterclockwise direction until the images corresponding to these contacts were brought into alignment with the images of the other contacts. Thus, when testing a distributor, the contacts 68 and 69 are first adjusted to the correct angle of closure and then the bearing 50 is adjusted until the images formed by these contacts are brought into alignment.

Fig. 4 shows the contacts of one breaker arm closing for a longer period than the contacts of the other breaker arm. The adjustment to correct this condition is made by inserting an adjusting tool through the cutaway portion 82 of the housing 3 and thereby adjusting the separation of the contacts 68 and 69 while the engine is in operation.

Should the retractile spring 83 have sufficient tension against either breaker arm so that chatter or vibration of the contacts 68 or 69 results, this condition will cause more than one image to be formed on the scale, these images being closely spaced in accordance with the frequency of the vibration. Should the images formed by a breaker arm not appear in vertical alignment, this condition is indicative of a mechanical defect in the distributor such as, for example, a worn or eccentric cam, loose bearings and the like.

In certain types of automobile engines where it is not practicable to place a device of the character described directly upon the engine distributor, the arrangement shown on Fig. 10 may be employed which comprises a projecting shelf having a testing unit secured thereto, mounted upon a fixture which may be moved proximate to the automobile engine and connected by means of a flexible shaft. This arrangement provides means for testing the distributor of an automobile engine while in operation by the engine in cases where the engine design is not suitable to have the testing device mounted directly upon the distributor.

While the device shown in Figs. 1 to 9 is adapted for use with an 8 cylinder engine it will be understood that the device may, with suitable changes, be employed for testing four, six, twelve or any other number of cylinders by providing apertures 40 corresponding in number to the number of cylinders, and spacing the apertures the required number of degrees depending upon the number and arrangement of cylinders in the engine to be tested.

In order to provide a universal testing device suitable for use with the different types of distributors of engines having different numbers of cylinders, an alternative arrangement of the apertures 40 would be to provide a set of apertures on the upper portion of the drum for use with an eight cylinder engine and one or more sets of apertures on another portion of the drum for engines having a different number of cylinders. The shaft 7 would have mounted thereon additional cams as 51 arranged to cooperate with breaker arm assemblies for operating these engines. Sufficient sets of apertures would thus be provided on the same drum to take care of the different types of automobile engines encountered in service by the use of a single testing device. When this arrangement is employed, however, the drum 33 may be made longer with a corresponding increase in the opening 86 through which the images are viewed.

It is the usual practice to employ two breaker arms having individual induction coils in ignition systems for twelve cylinder engines. When testing systems of this character, each set of breaker points may be successively connected to the induction coil 48 by the lead 73 or two induction coils and two glow discharge tubes may be employed. Each glow discharge tube may be filled with a different gas in order to produce a set of colored images each distinctive of a pair of breaker points. Another arrangement would comprise the use of two or more glow discharge tubes at different levels within the drum and separated by a light shield so that each tube would cooperate with an individual set of apertures 40.

It will thus be seen that I have provided an inexpensive and efficient means for testing the ignition systems of multi-cylinder internal combustion engines. The particular tests herein disclosed are illustrated only by way of example of the many different kinds of tests which may be made by the use of this apparatus.

Obviously various other modifications and arrangements, embodying the invention, will occur to those skilled in the art and, therefore, I do not desire to be limited to the details shown and described, except in accordance with the appended claims.

What I claim is:

1. A system for testing the distributor in the ignition circuit of a multi-cylinder internal combustion engine, said system comprising means including an auxiliary distributor for firing the cylinders of the engine in their regular order, said auxiliary distributor including means for removably inserting the auxiliary distributor between the breaker point housing and the distributor cap thereof, a rotatable shaft connected to said auxiliary distributor and having means adapted for engagement with the distributor to be tested, an indicator operated by said shaft having a plurality of indicating means rotatable in different parallel planes about said shaft, a gaseous discharge tube disposed within said indicating means, means controlled by the first named distributor and the position of said indicating means for causing said gaseous discharge tube to flash as the breaker contacts of said first named distributor operate, means for adjusting said indicator while in operation to indicate the adjustment of the distributor under test and means providing access to the distributor for adjusting the breaker mechanism thereof while the engine is operated by the first named means.

2. A device for testing the ignition of a multi-cylinder internal combustion engine having a distributor driven by a shaft from the engine, the distributor having breaker points for determining the times of firing of the respective cylinders of the engine, said testing device comprising a rotatable element having apertures therein, an adjustable scale movable relative to said rotatable element and having a series of indicia thereon, a source of light cooperating with said movable element to register readings on the scale as the light flashes, means including an auxiliary distributor driven by said engine for flashing said light as the breaker points of the distributor under test are operated by the engine, thus to permit observation of the positions of the apertures of said rotatable element with respect to said scale when they are defined by said source of light thereby to enable direct visual comparison of the times of closure and opening of the breaker points under test.

3. In a system for testing the ignition of a multi-cylinder internal combustion engine having a distributor driven by shaft from the engine, the distributor having breaker points for controlling the firing of the cylinders of the engine, a testing device, means for operating said testing device by the engine, said operating means including a drive shaft connectible to said distributor shaft, means for firing the cylinders of the engine in their regular order while said testing device is operated by the engine, said device comprising a rotatable hollow cylinder mounted on said drive shaft and having an aperture corresponding to each cylinder of the engine, said apertures being positioned equal angles apart on a single turn helix in the periphery of the cylinder, an arcuate scale, means for connecting said drive shaft and said indicator for rotation with the distributor shaft, a well in which the indicator rotates, and a light emitting gaseous discharge tube connecting with said breaker points and a source of current and cooperating with the indicator for continuously indicating on the arcuate scale the angle of closure of the breaker points while the distributor shaft is operated by the engine under control of the firing means.

4. A device for testing the ignition of a multi-cylinder internal combustion engine having a distributor normally connected to engine ignition circuit for determining the times of firing of the respective cylinders of the engine, said device comprising a second distributor adapted to be connected to the ignition circuit to fire the engine with the first named distributor operatively disconnected from the ignition circuit, said first named distributor being driven from the engine when the distributor is operatively disconnected from the ignition circuit and said second distributor is firing the engine, means controlled by the first named distributor when thus disconnected from the ignition circuit for producing a plurality of visual signals appearing simultaneously due to persistence of vision and respectively representing the times of firing of said cylinders as normally determined by the first named distributor when operating, and means for causing all of said signals to appear in alignment with each other when said cylinders are firing at the proper times as normally determined by the first named distributor, thereby to enable direct visual comparison of the times of firing of the respective cylinders.

5. A device for testing the ignition of a multi-cylinder internal combustion engine having a distributor normally connected to engine ignition circuit for determining the times of firing of the respective cylinders, said testing device comprising a second distributor adapted to be connected to the ignition circuit to fire the engine with the first named distributor operatively disconnected from the ignition circuit, said first named distributor being driven from the engine when the distributor is operatively disconnected from the ignition circuit and said second distributor is firing the engine, means controlled by the first named distributor when thus disconnected from the ignition circuit for producing a series of visual signals appearing simultaneously due to persistence of vision, each signal being individual to one of said cylinders and representing the first named time of operation of the distributor normally to effect firing of such cylinder, and means for causing said signals to appear in alignment or misalignment respectively depending upon whether the first named distributor is properly or improperly operating to effect firing of the various cylinders, thereby to enable direct visual comparison of the times of firing of the cylinders as normally determined by the first named distributor.

6. A device for testing the ignition of an internal combustion engine having a distributor with contact elements for determining the time of firing of the engine, said testing device comprising means for operating the distributor, means for producing a first light image at the time of closure of said contact elements for firing the engine, means for producing a second light image at the time of opening of said contact elements, and means for suppressing said first light image between the times of closure and opening of said contact elements, said images appearing simultaneously due to persistence of vision and enabling direct visual comparison of the times of closure and opening of said distributor contact elements and providing means for indicating whether a vibrating condition of the contact elements exists.

7. A device for testing the ignition of an internal combustion engine having a distributor with contact elements for determining the time of firing of the engine, said testing device comprising means including a shaft for operating the distributor, a source of light intermittently displayed in accordance with the operation of said contact elements, a hollow cylinder mounted coaxially on said shaft, said cylinder comprising a mask for said light, said mask having at least two apertures therein, means for causing relative movement between said source of intermittent light and the mask as said distributor elements operate, said source of intermittent light and the apertured portion of the mask coacting to cause at least two light images to appear, one of said images indicating the time of closure of the contact elements and the other indicating the time of opening of the contact elements, said last named means causing said images to appear simultaneously due to persistence of vision, thereby to enable direct visual comparison of the times of closure and opening of the distributor contact elements, and provide means for indicating whether a vibrating condition of the contact elements exists.

8. A device for testing the ignition of a multi-cylinder internal combustion engine having a distributor with contact elements for determining the times of firing of the respective cylinders of the engine, means for causing said distributor contact elements successively to move to closed-circuit and open-circuit positions corresponding to the times of firing of the cylinders of the engine, a source of light intermittently displayed in accordance with the operation of said contact elements, a shaft connected with said distributor, a hollow cylinder mounted coaxially on the shaft, said cylinder comprising a mask for said light, said mask having a set of apertures corresponding in number to the number of cylinders of the engine and each aperture being individual to one of said cylinders, means for causing relative movement between said source of intermittent light and the apertured portion of the mask for causing two sets of light images to appear, one of the sets of images indicating the times of closure of the distributor contact elements and the other set of images indicating the times of opening of the contact elements, said last named means causing both sets of images to appear simultaneously due to persistence of vision, thereby to enable direct visual comparison of the times of closure and opening of the contact elements of the distributor and providing means for indicating whether a vibrating condition of the contact elements exists.

9. In a system for testing the ignition of a multi-cylinder internal combustion engine, a device removably insertable between the breaker point housing and the distributor cap thereof, comprising a shaft having a breaker cam and a hollow cylinder mounted thereon coaxially with said shaft, breaker points under control of said breaker cam, a gaseous discharge tube stationarily positioned within said hollow cylinder; said hollow cylinder having an aperture corresponding to each cylinder of said engine, said apertures being located equal angles apart on a single turn helix in the periphery of the cylinder; said shaft being connected at its lower end with the distributor shaft of said engine by means of a coupling and having a distributor arm mounted on its upper end; said shaft, cam, breaker points, hollow cylinder and gaseous discharge tube being enclosed within a casing; said casing providing support for said gaseous discharge tube, said breaker points, and for said engine distributor cap; said casing having bearings to permit rotation of said shaft with its associated cam, hollow cylinder and distributor arm within said casing and having a window; said window being covered by a translucent scale to thus permit observation of the positions of said cylinder apertures when they are defined by the illumination of said gaseous discharge tube thereby to enable direct visual comparison of the times of closure and opening of the breaker points under test.

ALEXANDER C. MULLER.